May 11, 1937.   E. C. FRITTS   2,080,040
MOUNTING FOR OVERSIZE REELS ON PROJECTORS
Filed Oct. 12, 1935
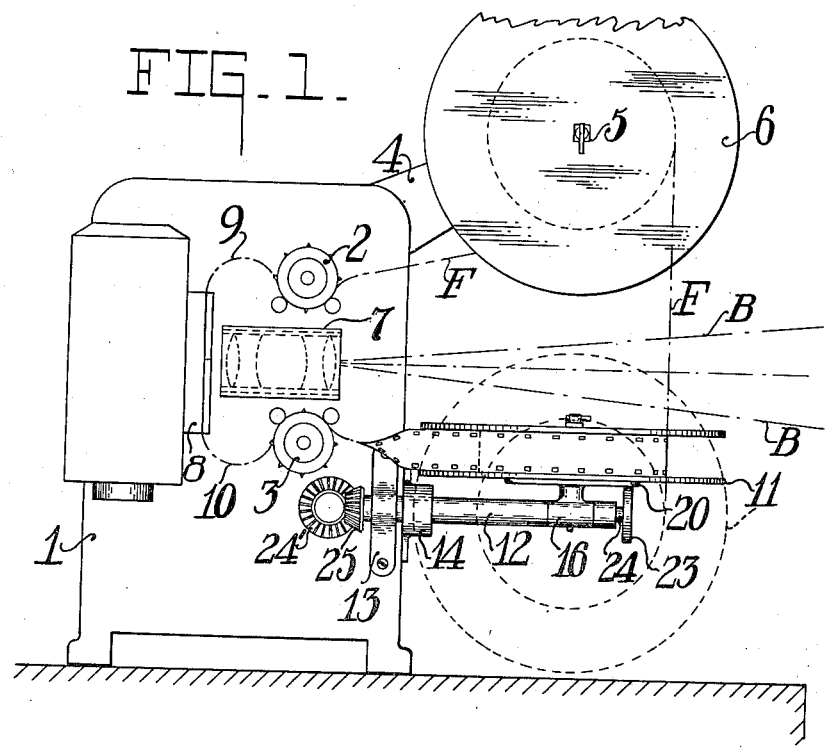
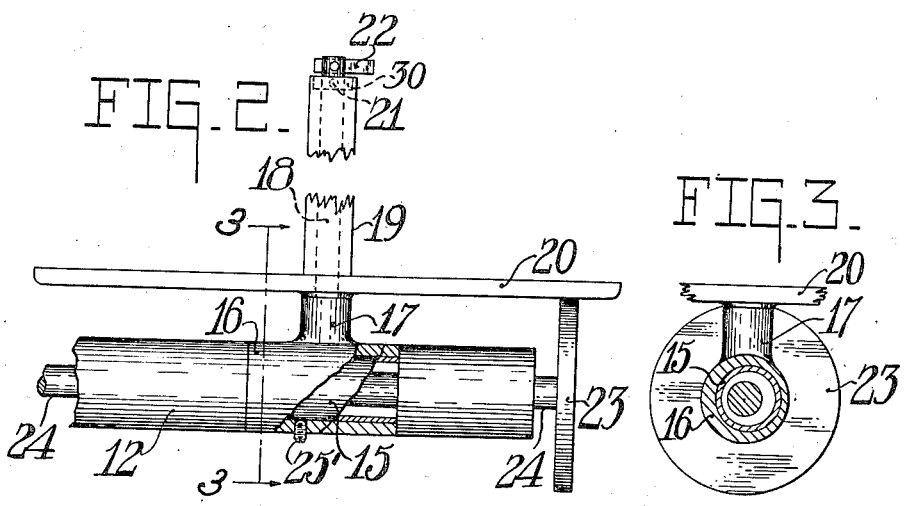
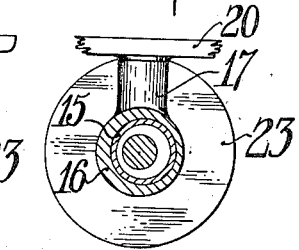
INVENTOR
Edwin C. Fritts,
BY
ATTORNEYS.

Patented May 11, 1937

2,080,040

UNITED STATES PATENT OFFICE 2,080,040

MOUNTING FOR OVERSIZE REELS ON PROJECTORS

Edwin C. Fritts, Rochester, N. Y., assignor, by mesne assignments, to Eastman Kodak Company, Jersey City, N. J., a corporation of New Jersey Application October 12, 1935, Serial No. 44,758

5 Claims. (Cl. 242—55)

This invention relates to photography, and particularly to a motion picture projector on which the supply and take-up reels are so mounted to adapt the apparatus to the use of oversized reels.

One of the primary requirements in designing a portable 16 mm. motion picture projector is that the projector be as small and compact as possible and still operate in an efficient manner. Therefore, in a projector designed along this line, it follows that the distance between the projected light beam and the table support on which the projector rests is more or less limited, and on a projector of this size, where the reels are mounted in vertical alignment, with the supply reel above the projection beam and the take-up reel intermediate the projection beam and the table support on which the projector rests, the size of the take-up reel must be confined to one of such diameter that it will clear the light beam and the table support. Therefore, one object of my invention is to mount the take-up reel of the projector in a substantially horizontal position in its take-up position, and thereby provide for the use of oversized reels without necessitating an enlargement in the size of the main body portion of the projector, and particularly to eliminate the necessity of increasing the vertical distance between the projection beam and the table support on which the projector rests. Throughout this specification, when I mention an over-sized reel, I am referring to a reel whose diameter is greater than the vertical distance between the projected light beam of the particular projector on which it is to be mounted and the table support on which the projector rests, so that if said reel was mounted vertically between the two as the take-up reel, it would project into and obstruct the light beam of the projector.

Another object of my invention is to provide a rotatable mounting for an over-sized take-up reel so that it can be swung from its horizontal takeup position to a vertical position in line with the supply reel for rewinding purposes. Still another object is to provide means whereby the take-up reel on being rotated from the take-up position to the rewind position and vice versa, is automatically disconnected or connected with the driving means for the take-up spindle.

To satisfactorily use over-sized reels on a small motion picture projector, I mount the take-up reel in a substantially horizontal position while the supply reel is always mounted in a vertical position. By mounting the over-sized take-up reel in a substantially horizontal position for its take-up position and rotating the film from the take-up sprocket through 90 degrees for reception on to said reel, I insure that the projection beam of the projector is unobstructed during projection even though its position relative to the projector support has not been altered. To facilitate rewinding the film, I rotatably mount the take-up reel so that it can be rotated through 90 degrees and be in vertical alignment with the supply reel. In the rewind position, the takeup reel is mounted so as to clear the support on which the projector rests, and due to its size, it will necessarily project into the normal path of the projection beam, but during the rewinding of the film this fact is of no consequence. The driving connection for the takeup spindle is automatically controlled by the rotation of said take-up reel into and out of its two positions.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing, in which, Figure 1 is a side elevation of a motion picture projector showing the two positions of the take-up reel.

Figure 2 is an elevation, partly in section, of the mounting means for the take-up spindle, and, Figure 3 is a section taken on line 3—3 of Figure 2.

As a preferred embodiment of my invention, I have shown in Figure 1 a typical motion picture projector comprising a housing 1 to which there is an arm 4 attached toward the top of the housing, this arm supporting a shaft 5 adapted to receive the supply reel 6 of film. The arm 4 is long enough and extends away from the projector at such an angle that the supply reel 6 mounted thereon can be over-sized and still not interfere with the housing 1 or enter the cone of light beam B which is emitted from the objective 7. This supply reel may be provided with any suitable driving means for rewinding purposes, such as a pulley and belt, not shown. The sprockets 2 and 3 move the film to and from the loops 9 and 10, and some form of intermittent pull-down is employed in the gate 8 for intermittently moving the film past an exposure aperture as is customary with machines of this type. From sprocket 3 the film is advanced to and taken up by the take-up reel after being turned through 90 degrees. Inasmuch as the take-up reel 11 is an over-sized reel and would project into the cone of projected light B if it were mounted in vertical alignment with the supply reel 6 for take-up purposes, as shown clearly in the dotted position of the reel in Figure 1, I avoid this difficulty and provide for the use of the over-sized reel 11 by mounting it horizontally in its take-up position. The mounting means for the take-up reel 11 consists of the tube shafting 12 which is fixed to the projector housing 1 by means of a bracket 13 and an offset collar 14. The periphery of this tube shafting 12 is recessed to a depth less than its thickness to form a seating ring 15, said seating ring having its periphery eccentric with the periphery of the tube shafting proper. Collar 16 is rotatably mounted on the recessed seating ring 15, and its periphery is eccentric with the seating ring but concentric with the periphery of the tube shafting 12 in the position shown in Figs. 2 and 3. Integral with the collar 16 is the post 17 forming a T section on which a spindle 18 is mounted. Sleeve 19, on which the friction disk 20 is fixedly mounted, is slipped over the spindle 18 so that it is rotatably mounted with respect to the post 17 as well as with the spindle 18, and is held in position on said spindle by means of collar 30 which is positioned on the spindle 18 by virtue of a set screw 21. The exterior of sleeve 19 is preferably square to engage a square hole in the take-up reel so that the reel which is held on the sleeve by the usual latch 22, will be rotated by the sleeve 19 as described below.

The take-up spindle 18 is rotated by means of the frictional engagement between the friction disk 20 and a positively driven friction wheel 23. The friction wheel 23 is positively driven by means of the shaft 24 which is rotated by the engagement of the bevel gears 24' and 25, said shaft being properly journaled to rotate within the tube shafting 12. As shown in Fig. 3, the periphery of the collar 16, on which the post 17 is mounted, is concentric with the shaft 24 which drives the friction wheel 23, and they are both eccentric with reference to the seating ring 15 on which the collar 16 is rotatably mounted. Therefore, it is obvious that as the collar 16 is rotated through 90 degrees on the seating ring 15 to the rewind position, the post 17 and consequently the friction disk 20 is shifted sufficiently to relieve the frictional engagement between the friction disk 20 and the driving friction wheel 23 thereby allowing take-up reel to rotate idly.

After the film F has completely passed through the projector and has been wound onto the take-up reel, said reel is rotated through 90 degrees to be in vertical alignment with the supply reel for rewinding purposes, as shown by the dotted lines in Figure 1, and the film F passes directly from one reel to the other outside of the projector. The over-sized proportion of the take-up reel, with respect to the projector on which it is used, is allowed for in the rewind position by so mounting the reel that it projects into the path of the cone of light B in this rewind position, as shown in Figure 1, but since no light is projected during the rewind operation this interference is of no consequence. Therefore, to effect a rewinding of the film F, the first step is to shift the gearing of the projector proper so that the driving power is shifted from the main take-up driving gear 24' to the above mentioned pulley driving means of the supply reel, this step is common to all projectors and may be accomplished in any well-known manner. Take-up reel 11 is then rotated through 90 degrees from its horizontal take-up position to its vertical rewind position, said rotation automatically disconnecting said reel and its spindle from their frictional driving connection and allowing them to rotate freely on the spindle 18 as described above. In order to fix the take-up reel 11, in either its take-up or rewind position, I have shown a set screw 25' which passes through the collar 16 and binds against the seating ring 15 to fix the two relative to each other in either the take-up or rewind position of the take-up reel. I want to point out that the positioning of the collar 16 relative to the seating ring 15 can be accomplished in a number of different ways so that my invention should not be limited to the form of adjustment that I have shown for illustrative purposes only.

Although I have shown and described certain specific embodiments of my invention, I am fully aware that many modifications thereof are possible. My invention, therefore, is not to be restricted except in so far as is necessitated by the prior art and by the spirit of the appended claims.

Having thus described my invention, what I claim as new and desire to secure by Letters Patent is:

1. In a motion picture projector, a film advancing mechanism, a support for the supply reel of the film in a definite position at which the film can be drawn from the reel thereon by said film advancing mechanism, a support for the take-up reel capable of two positions relative to said definite position, a first position constituting the take-up position and at which the take-up reel thereon is at right angles to the supply reel on said definite positioned support, and a second position for said support at which the takeup reel thereon is in alignment with the reel on said first support for rewinding.

2. In a motion picture apparatus, film advancing mechanism, a support definitely positioned for mounting the supply reel so that the film can be drawn therefrom by the film advancing mechanism, a support for the take-up reel rotatably mounted so as to have two positions, a first position at which the take-up reel thereon is at right angles to the supply reel on the definitely positioned support and in which position it receives the film from the film advancing mechanism, and a second position at which the take-up reel mounted thereon is in alignment with the supply reel on said first support for rewinding.

3. In a motion picture apparatus, film advancing mechanism, a support having a definite position for mounting the supply reel thereon in a vertical position so that the film can be drawn therefrom by the film advancing mechanism, a support for the take-up reel rotatably mounted so as to have two positions, a first position at which the take-up reel thereon is mounted horizontally said first position constituting the take-up position, a second position at which the take-up reel mounted thereon is in vertical alignment with the supply reel on said first support for rewinding, driving means for said take-up reel support, and means whereby the support for the take-up reel is automatically disconnected from said driving means when said support is rotated into vertical alignment with the supply reel for rewinding.

4. In a motion picture apparatus, film advancing mechanism, a support definitely positioned for mounting the supply reel so that the film can be drawn therefrom by the film advancing mechanism, a support for the take-up reel capable of two positions, a first position at which the take-up reel thereon is at right angles to the supply reel on the definitely positioned support in which position it receives the film from the film advancing mechanism, a second position at which the take-up reel mounted thereon is in alignment with the supply reel of said support for rewinding purposes, driving means for said take-up reel support, and means whereby the support for the take-up reel is automatically disconnected from said driving means when said support is moved to the rewinding position relative to the supply reel.

5. In a motion picture apparatus, film advancing mechanism, a support definitely positioned for mounting the supply reel so that the film can be drawn therefrom by the film advancing mechanism, a support for the take-up reel capable of two positions, a first position at which the take-up reel thereon is at right angles to the supply reel on the definitely positioned support, and in which position it receives the film from the film advancing mechanism, and a second position at which the take-up reel mounted thereon is in alignment with the supply reel on said first support for rewinding purposes.

EDWIN C. FRITTS.